(12) United States Patent
Wolf et al.

(10) Patent No.: US 6,188,685 B1
(45) Date of Patent: Feb. 13, 2001

(54) SYNCHRONOUS DIGITAL TRANSMISSION SYSTEM

(75) Inventors: Michael Wolf, Mundelsheim; Geoffrey Dive, Aspach; Jürgen Kasper, Stuttgart, all of (DE)

(73) Assignee: Alcatel, Paris (FR)

( * ) Notice: Under 35 U.S.C. 154(b), the term of this patent shall be extended for 0 days.

(21) Appl. No.: 08/766,767

(22) Filed: Dec. 3, 1996

(30) Foreign Application Priority Data

Dec. 7, 1995 (DE) .............................................. 195 45 675

(51) Int. Cl.⁷ ................................................... H04L 12/50
(52) U.S. Cl. ............................................. 370/378; 370/506
(58) Field of Search .................................... 370/377, 378, 370/379, 412, 474, 476, 475, 470, 471, 505, 506, 907

(56) References Cited

U.S. PATENT DOCUMENTS

| | | |
|---|---|---|
| 4,761,778 | 8/1988 | Hui . |
| 5,263,028 * | 11/1993 | Borgnis .............................. 370/105.1 |
| 5,343,476 * | 8/1994 | Urbansky .............................. 370/102 |
| 5,361,263 * | 11/1994 | Urbansky .............................. 370/102 |
| 5,446,738 * | 8/1995 | Kim et al. ............................ 370/395 |
| 5,563,890 * | 10/1996 | Freitas ..................................... 370/99 |
| 5,666,351 * | 9/1997 | Oksanen et al. ...................... 370/474 |

FOREIGN PATENT DOCUMENTS

| | | |
|---|---|---|
| 4025831 | 2/1992 | (DE) . |
| 4339586 | 5/1995 | (DE) . |

OTHER PUBLICATIONS

CCITT Recommendations G.707, G.708 and G.709, pp. 107–175.

"Synchronous digital hierarchy network pointer simulation", Computer Networks and ISDN Systems 26, 1994, pp. 481–491 by Henry L. Owen and Thomas M. Klett.

"Methodology and Results of Synchronous Digital Hierarchy Network Payload Jitter Simulation" by Henry L. Owen and Peter E. Sholander, Simulation, Jan. 1995, pp. 1–8.

U.S. Serial Number 08/389,308 filed Feb. 16, 1995 application for Synchronous Digital Transmission System, not yet issued.

* cited by examiner

Primary Examiner—Chau Nguyen
Assistant Examiner—Alexander Boakye
(74) Attorney, Agent, or Firm—Ware, Fressola, Van Der Sluys & Adolphson LLP

(57) ABSTRACT

A transmission system is indicated for digital signals combined into a multiplex signal, and a network element for such a transmission system. Each network element contains an adapter circuit to balance phase variations in an incoming multiplex signal. The adapter circuit has a buffer memory (1) for payload data bytes, a write address generator (2) which controls the buffer memory (1) in a way so that a number of payload data bytes is stored within one write cycle, and has a read address generator (3) which controls the buffer memory (1) in a way so that the number of payload data bytes stored within the write cycle is greater than the number of payload data bytes read during the read cycle. Each network element has a sort facility (5) which sorts the read payload data bytes, so that a multiplex signal that is transmitted by a network element has the established frame format.

10 Claims, 2 Drawing Sheets

SYNCHRONOUS DIGITAL TRANSMISSION SYSTEM

TECHNICAL FIELD

The invention a a transmission system for digital signals which are combined into a multiplex signal in which the digital signals are inserted in the form of bytes into frames of an established frame format, where each frame has areas for control data and areas for payload data, in which several network elements that are interconnected by transmission media are located, each comprising an adapter circuit to balance phase variations in an incoming multiplex signal, and where the adapter circuit has a buffer memory for payload data bytes, a write address generator which controls the buffer memory in a way so that a number of payload data bytes are stored within a write cycle, and has a read address generator which controls the buffer memory in a way so that a number of payload data bytes are read within a read cycle. The invention is also directed to a network element for such a transmission system.

BACKGROUND OF THE INVENTION

A transmission system for digital signals which are combined into a multiplex signal is e.g. a transmission system for the synchronous digital hierarchy, or a transmission system for synchronous optical networks conforming to the SONET standard, which the American National Standards Institute has adopted. In a transmission system for the synchronous digital hierarchy (SDH), and in a transmission system conforming to the SONET standard, signals to be transmitted are combined into a multiplex signal and are structured in frame form. Such a frame is called a synchronous transport module STM in the SDH; it is described e.g. in the CCITT recommendations G.707, G.708 and G.709. The frame comprises 270 columns and 9 lines. Each column of a line contains one byte: the columns 1 to 9 in lines 1 to 3 and 5 to 9 each have the so-called Section Overhead (SOH) for control and error detection information. Column 1 to 9 in the fourth line has a pointer-managing unit which is designated an AU-Pointer (AU-P). The payload information, the "STM-1 Payload" is stored in the remaining columns and lines. An "STM-1 Payload" is e.g. stored in a virtual container VC-4, which contains an area for payload data and an area for control data (path overhead POH).

Further units established in SDH are e.g. administrative units, e.g. AU-4, which are composed of a virtual container VC and an AU-Pointer, and tributary units, e.g. TU-12, which are composed of a virtual container and a TU-Pointer.

STM signals are emitted via a transmission path containing circuits at predetermined intervals, e.g. at network elements, in which an incoming STM-1 signal is adapted to a local (internal) standardized clock pulse of the network element. These circuits perform clock pulse adaptations and balance the phase variations by means of a known byte-stuffing method. When required in this case, stuffing bytes are inserted at predetermined places in the frame (bytes H1, H2, H3) (CCITT recommendation G.709). The payload data are omitted from the stuffing place with a positive stuffing procedure, and payload data are inserted into the stuffing place with a negative stuffing procedure. A stuffing procedure is also called a pointer action, since the value of the pointer must be changed after each stuffing procedure; the pointer then points to a different payload data byte.

An investigation of these pointer actions with the model of an SDH transmission system is known from: Henry L. Owen and Thomas M. Klett "Synchronous digital hierarchy network pointer simulation", Computer Networks and ISDN Systems 26, 1994, pages 481 to 491. The model illustrated in FIG. 3 therein comprises a number of network elements 1, . . . ,N−1. In network element 1, signals (telephone, video, computer data) are supplied to the network and combined into SDH signals in a mapper (synchronizer). An internal clock pulse is assigned to each network element N. FIG. 5 therein illustrates a model of a network element N. A flexible memory (first-in, first-out, FIFO) serially receives frames of an input signal with the clock pulse of the preceding network element N−1. The bytes are written to the memory with this clock pulse, and the bytes are read from the memory with the clock pulse of network element N. Whether a byte is written to the memory depends on whether it is a payload data byte or an overhead byte. This takes place through a byte presenter illustrated in FIG. 5, which is controlled by the clock pulse of the preceding network element N−1. In the case of an AU-4, all payload data bytes are written to the same memory and other cases have different memories for different kinds of payload data. The number of bytes in the memory determines when the memory is too full or too empty. Pointer actions are triggered by a defined upper and lower threshold value, which is controlled by a stuffing device (pointer request generator, pointer processor). Disturbing effects can occur with these pointer actions, which cause phase variations at the receiving place (desynchronizer). These effects are described e.g. in: Henry L. Owen and Peter E. Sholander "Methodology and Results of Synchronous Digital Hierarchy Network Payload Jitter Simulation" SIMULATION, January 1995, pages 1 to 8. These effects occur when a network node is in a standby (holdover) condition following the failure of an external synchronization source, and a stuffing device derives the pointer actions as a function of the fill level of a memory with fixed threshold values. Clock pulse differences of up to +/−4.6 ppm can take place during the standby condition.

SUMMARY OF THE INVENTION

The invention has the task of introducing a transmission system for digital signals that are combined into a multiplex signal, in which the mentioned disturbing effects no longer occur. Such a transmission system is for digital signals that are combined into a multiplex signal, in which the digital signals are inserted in the form of bytes into frames of an established frame format, where each frame has areas for control data and areas for payload data, in which several network elements that are interconnected by transmission media are located, each comprising an adapter circuit to balance phase variations in an incoming multiplex signal, and where the adapter circuit has a buffer memory for payload data bytes, a write address generator which controls the buffer memory in a way so that a number of payload data bytes are stored within a write cycle, and has a read address generator which controls the buffer memory in a way so that a number of payload data bytes are read within a read cycle, characterized in that the read address generator is controlled so that the number of payload data bytes read within the read cycle is less than the number of payload data bytes stored within a write cycle, and in that each network element has a sort facility which sorts the payload data bytes so that a multiplex signal transmitted by a network element has the established frame format. The invention has the additional task of introducing a network element for such a transmission system. It is thus a network element of a transmission system for digital signals that are combined into a multiplex signal, which are inserted in the form of bytes into frames of an established frame format, where each frame has areas for control data and areas for payload data, with an adapter circuit for balancing phase variations in a multiplex signal which can be supplied to the network element, having a buffer memory for payload data bytes, a write address generator which controls the buffer memory in a way so that a number of payload data bytes are stored within a write cycle, and a read address generator which controls the buffer memory in a way so that a number of payload data bytes are read within a read cycle, characterized in that the read address generator is controlled so that the number of payload data bytes read within the read cycle is less than the number of payload data bytes stored within a write cycle, and in that the network element has a sort facility which sorts the read payload data bytes so that a multiplex signal transmitted by a network element has the established frame format.

One advantage of the invention is that the network elements can be adapted to the solution at a very low cost.

The basic idea of the invention is to change the read cycles within a network element, so that the frame format established by the SDH standard is intentionally dissolved; the result being that internal frames are quasi nonconforming with SDH. This produces uniformly distributed pointer actions in the invention, and a socalled uniform pointer processor is therefore created in this manner.

BRIEF DESCRIPTION OF THE DRAWINGS

In the following the invention is explained as an example by means of drawings, where.

BEST MODE FOR CARRYING OUT THE INVENTION

Figure 1:
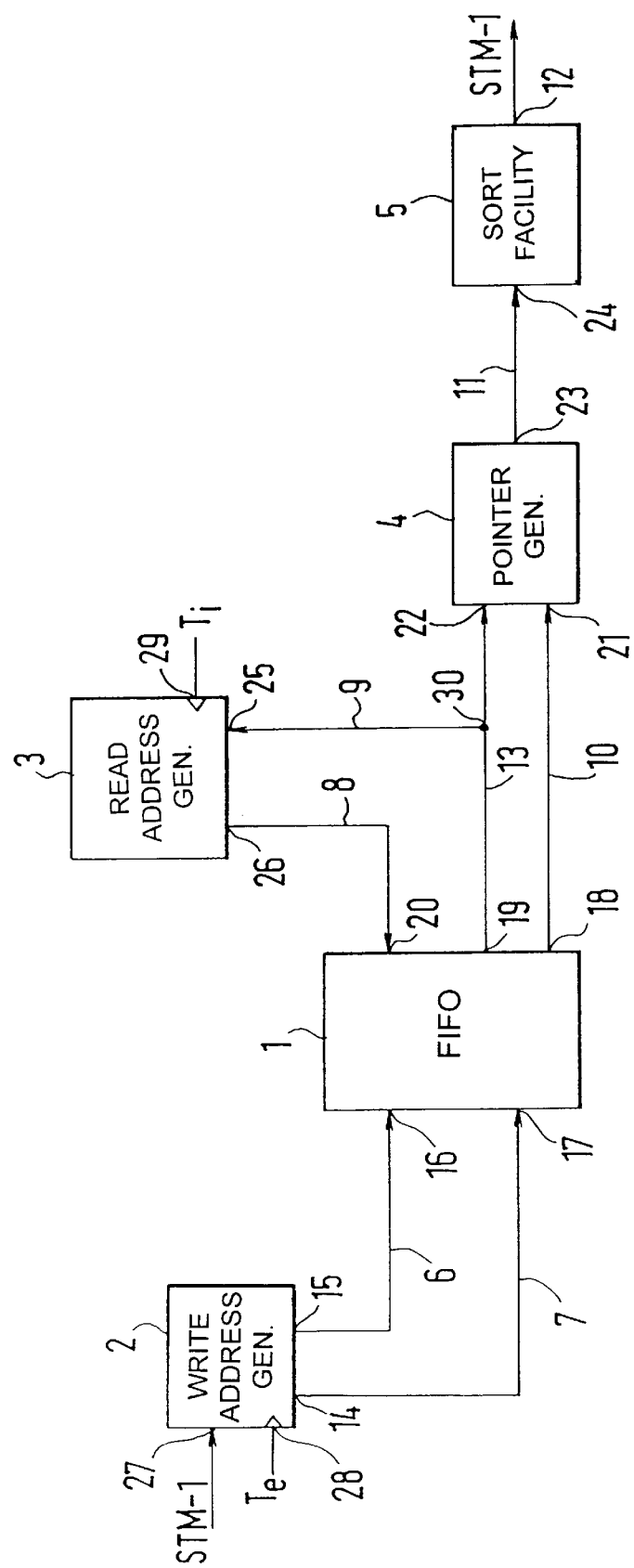
FIG. 1 is an adapter circuit located in a network element.

FIG. 1 illustrates an adapter circuit located in a network element, with components that are relevant for the invention. This network element is part of a transmission system in which digital signals are combined into a multiplex signal. The invention is described in the following as an example by means of a transmission system for the synchronous digital hierarchy (SDH), called an SDH system in the following. The basic idea of the invention can also be applied to other transmission systems, e.g. a transmission system that conforms to the SONET standard. In an SDH system, several network elements are interconnected in the known manner by means of different transmission media. For that reason the following description of the invention is mainly with reference to a network element; the SDH system is only mentioned to the extent needed to understand the invention. The concepts applied to SDH systems are used here as well.

The adapter circuit schematically depicted in FIG. 1 has a write address generator 2, a buffer memory 1 designated in FIG. 1 as FIFO (First-In, First-Out), a read address generator 3, a pointer generator 4 and a sort facility 5, which are interconnected as follows: The read address generator 2 has two connections 14, 15, which are linked to two connections 16, 17 of the buffer memory 1. The connection 15 is linked to connection 16 by a connection 6, and the connection 14 is linked to connection 17 by a connection 7. In addition, the buffer memory 1 has three further connections 18, 19, 20; connection 18 is linked by a connection 8 to a connection 26 of the read address generator 3, connection 19 is linked by a connection 13 to a connection 22 of the pointer generator 4, and connection 18 is linked by a connection 10 to a connection 21 of the pointer generator 4. A connection 9 is linked to an area 30 of connection 30, which is linked to a connection 25 of the read address generator 3.

The pointer generator 4 has an output 23 which is linked by a connection 11 to the input 24 of the sort facility 5.

An STM-1 signal, which can be supplied to an input 27 of the read address generator 2, arrives e.g. at the network element. This STM-1 signal arrives at the network element with an external clock pulse $T_e$, which was originated in a preceding network element. The external clock pulse $T_e$ is derived from the incoming STM-1 signal in the network element, and is supplied to a clock pulse input 28 of the read address generator 2.

The read address generator 2 is part of a receiver not illustrated in FIG. 1, which is present in every network element and is responsible for identifying the incoming bytes and for recovering the external clock pulse $T_e$ from the incoming STM-1 signal.

The external clock pulse $T_e$ (line clock) of the preceding network element determines when the next payload byte is written to (stored in) the buffer memory 1. The receiver, in conjunction with the write address generator 2, identifies the incoming bytes and separates the payload data bytes from the control data bytes, hereafter called SOH bytes, and for each payload data byte provides a write address where the respective payload data byte is to be stored.

The following storage cycle takes place in a VC-4 as a condition of the frame format: payload data bytes are stored within a write cycle 261, no bytes are stored for the duration of 9 bytes (SOH bytes). Subsequently again, payload data bytes are stored within a write cycle 261 and no bytes are stored for the duration of 9 SOH bytes, etc. This creates a squence of 9 SOH bytes/261 bytes payload data for a VC-4. This storage of the payload data bytes is controlled by the write address generator 2, while the storage takes place at the external clock pulse $T_e$.

The read address generator 3 controls the readout from the buffer memory 1, where the reading takes place in accordance with an internal clock pulse $T_i$. The read address generator 3 has a clock pulse input 29 to which the internal clock pulse $T_i$ is supplied. This internal clock pulse $T_i$ of the network element is the (specified) clock pulse containing an STM-1 signal which exits from the network element.

Figure 2:
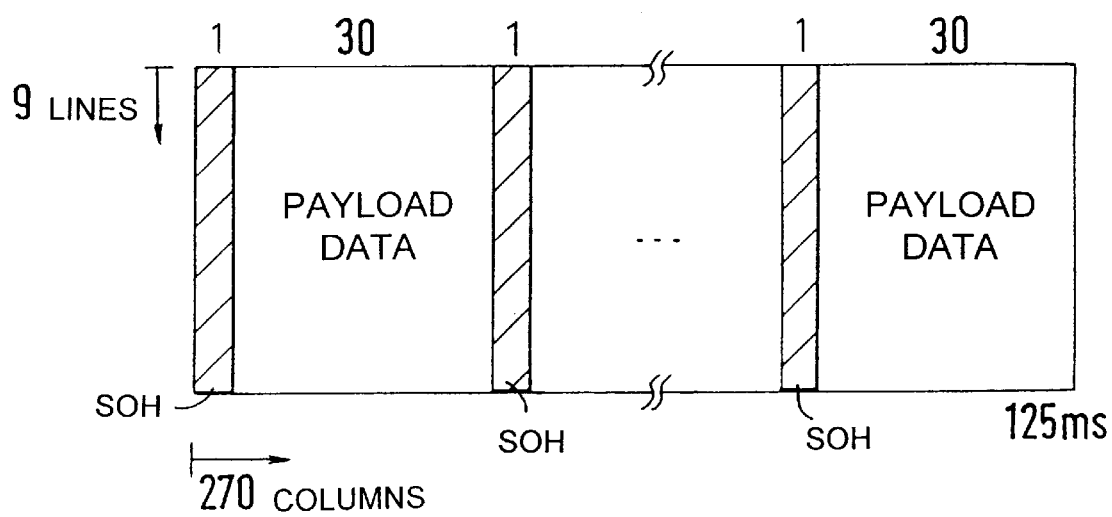
FIG. 2 is an example of the structure of an internal frame existing within a network element.

The read address generator 3 provides a read cycle according to which payload data bytes are read out from the storage addresses in the buffer memory 1 indicated by the generator. In accordance with the invention, the read address generator 3 is controlled so that the number of payload data bytes stored within the write cycle is greater than the number of payload data bytes read within the read cycle. No intervention takes place in the write cycle, i.e. 261 unchanged payload data bytes are stored on a regular basis, to which the mentioned duration of 9 SOH bytes is added. However the read cycle is changed, i.e. the read address generator 3 controls the buffer memory 1 so that e.g. 30 payload data bytes are read, followed by a pause of one SOH byte, then again 30 payload data bytes are read etc. This creates a sequence of "1 byte SOH/30 bytes payload data" for a VC-4. The invention causes the payload data bytes to be read out more uniformly from the buffer memory 1. Payload data bytes and SOH bytes are alternately combined into a 125 ms long frame, which creates an internal frame as illustrated in FIG. 2 for example.

The number of payload data bytes in the buffer memory 1 establishes when the buffer memory 1 is too full or too empty. If the difference between the read address and the write address of buffer memory 1 is greater than the upper threshold value (i.e. the buffer memory 1 is too full), a negative pointer action is requested (pointer justification request), whereby additional payload data bytes are read and inserted into the internal frame. Accordingly a positive pointer justification is requested when the difference between the read address and the write address of buffer memory 1 is smaller than the lower threshold value (i.e. the buffer memory 1 is too empty); no payload data bytes are read from the buffer memory 1. Three bytes are "stuffed" per pointer justification. This byte-stuffing procedure is known. With an adapter circuit according to the present invention the fill level of the buffer memory 1 changes continuously; the result is that pointer justifications take place on a more regular basis.

The pointer generator 4 records when a pointer justification has been requested and translates this information into a pointer change. Thus the pointer in the internal, and thereby also in the outgoing frame, has a value that differs from the value of the frame contained in the incoming STM-1 signal, i.e. it points to a different payload data byte.

The sort facility 5 sorts the read-out payload data bytes which exist in the internal frame in a way so that a multiplex signal transmitted by a network element has the established frame format. The STM-1 signal to be transmitted exits from an output 12 of the sort facility 5. In order to perform the sorting function, the sort facility 5 has the possibility of storing a number of bytes: for example, the bytes of a line in the internal frame can be stored in each case; however, the sort facility 5 can also be designed so that it only stores the SOH bytes and adds them to the payload data bytes at the time intervals established for an STM-1 signal.

FIG. 2 illustrates an example of an internal frame structure. This illustration is based on the illustration of an STM-N frame such as normally used in the literature. The internal frame also has 9 lines and 270 columns and a frame duration of 125 ms. The internal frame with 270 columns in FIG. 2 is only partially illustrated for the sake of simplification, as indicated by the broken lines and continuation dots.

The first column contains 9 SOH (hatched) bytes (1 column×9 lines) and the following 30 columns contain 270 payload data bytes (30 columns×9 lines). This is followed by a column of SOH bytes etc., until 270 columns have been filled.

The read address generator 3 can also control the buffer memory 1 in a way so that 15 payload data bytes are read in one read cycle, which is followed by a pause lasting one half SOH byte (4 SOH bits), etc. A further possibility is that 7.5 payload data bytes are read in one read cycle, followed by a pause lasting one fourth SOH byte (2 bits) etc. It is furthermore possible to read 3.75 payload data bytes in one read cycle, followed by a pause lasting one eighth SOH byte (1 bit).

According to the above-described possibilities of an internal frame for a VC-4, an internal frame for a TU-12 can be built under the following possibilities: a read cycle of 18 payload data bytes followed by a pause lasting one half SOH byte. A read cycle of 9 payload data bytes followed by a pause lasting one fourth SOH byte. A read cycle of 4.5 payload data bytes followed by a pause lasting one eighth SOH byte.

What is claimed is:

1. A transmission system for digital signals that are combined into a multiplex signal, in which the digital signals are inserted in the form of bytes into frames of an established frame format, where each frame has areas for overhead data and areas for payload data, in which several network elements that are interconnected by transmission media are located, each comprising an adapter circuit to balance phase variations in an incoming multiplex signal, and where the adapter circuit has a buffer memory (1) for payload data bytes, a write address generator (2) which controls writing into the buffer memory (1) in accordance with a write cycle which comprises a first number of payload data bytes as they occur in the multiplex signal and a pause of a first length when the overhead data bytes occur in the multiplex signal, a read address generator (3) which controls reading from the buffer memory (1) in accordance with a read cycle which comprises a second number of payload data bytes to be read and a pause of a second length for the overhead data bytes to be inserted, and a sort facility (5) which sorts the payload data bytes read from the buffer memory (1) in accordance with the read cycle so that a multiplex signal transmitted by the network element has the established frame format, characterized in that the second number is less than the first number and the second length is shorter than the first length.

2. A network element of a transmission system for digital signals that are combined into a multiplex signal, in which the digital signals are inserted in the form of bytes into frames of an established frame format, where each frame has areas for control data and areas for payload data, with an adapter circuit for balancing phase variations in a multiplex signal which can be supplied to the network element, said adapter circuit having a buffer memory (1) for payload data bytes, a write address generator (2) which controls writing into the buffer memory (1) in accordance with a write cycle which comprises a first number of payload data bytes as they occur in the multiplex signal and a pause of a first length when the overhead data bytes occur in the multiplex signal, a read address generator (3) which controls reading from the buffer memory (1) in according with a read cycle which comprises a second number of payload data bytes to be read and a pause of a second length for the overhead data bytes to be inserted, and a sort facility (5) which sorts the read payload data bytes read from the buffer memory (1) in accordance with the read cycle so that a multiplex signal transmitted by the network element has the established frame format, characterized in that the second number is less than the first number and the second length is shorter than the first length.

3. A network element as claimed in claim 2, characterized in that the multiplex signal is an STM-1 signal conforming to the SDH standard, and that for one VC-4 the number of payload data bytes read within the read cycle is 30, 15, 7, 5 or 3.75.

4. A network element as claimed in claim 2, characterized in that the multiplex signal is an STM-1 signal conforming to the SDH standard, and that for one TU-12 the number of payload data bytes read within the read cycle is 18, 9 or 4.5.

5. A network element of a transmission system for digital signals that are combined into a multiplex signal, in which the digital signals are inserted in the form of bytes into frames of an established frame format, where each frame has areas for control data and areas for payload data, with an adapter circuit for balancing phase variations in a multiplex signal which can be supplied to the network element, said adapter circuit having:

- a buffer memory (1) for payload data bytes:
- a write address generator (2) which controls writing into the buffer memory (1) in accordance with a write cycle which comprises a first number of payload data bytes as they occur in the multiplex signal and a pause of a first length when the overhead data bytes occur in the multiplex signal;
- a read address generator (3) which controls reading from the buffer memory (1) in accordance with a read cycle which comprises a second number of payload data bytes to be read and a pause of a second length for the overhead data bytes to be inserted; and
- a sort facility (5) which sorts the read payload data bytes read from the buffer memory (1) in accordance with the read cycle so that a multiplex signal transmitted by the network element has the established frame format, characterized in that the second number is less than the first number and the second length is shorter than the first length and the sort facility (5) is connected to a pointer-generator (4) located in the adapter circuit, which is connected to the read address generator (3) and the buffer memory (1), and supplies the payload data bytes and the control data bytes to be sorted to the sort facility (5).

6. A network element as claimed in claim 5, characterized in that the sort facility (5) temporarily stores a number of control data bytes and payload data bytes read within several read cycles and then sorts them, or that the sort facility (5) only stores the control data bytes and adds them to the read payload data bytes at established time intervals.

7. A transmission system as claimed in claim 1, characterized in that the multiplex signal is an STM-1 signal conforming to the SDH standard, and that for one VC-4 the number of payload data bytes read within the read cycle is 30, 15, 7, 5 or 3.75.

8. A transmission system as claimed in claim 1, characterized in that the multiplex signal is an STM-1 signal conforming to the SDH standard, and that for one TU-12 the number of payload data bytes read within the read cycle is 18, 9 or 4.5.

9. A transmission system for digital signals that are combined into a multiplex signal, in which the digital signals are inserted in the form of bytes into frames of an established frame format, where each frame has areas for overhead data and areas for payload data, in which several network elements that are interconnected by transmission media are located, each comprising an adapter circuit to balance phase variations in an incoming multiplex signal, and where the adapter circuit has:

- a buffer memory (1) for payload data bytes;
- a write address generator (2) which controls writing into the buffer memory (1) in accordance with a write cycle which comprises a first number of payload data bytes as they occur in the multiplex signal and a pause of a first length when the overhead data bytes occur in the multiplex signal;
- a read address generator (3) which controls reading from the buffer memory (1) in accordance with a read cycle which comprises a second number of payload data bytes to be read and a pause of a second length for the overhead data bytes to be inserted: and
- a sort facility (5) which sorts the payload data bytes read from the buffer memory (1) in accordance with the read cycle so that a multiplex signal transmitted by the network element has the established frame format, characterized in that the second number is less than the first number and the second length is shorter than the first length, and the sort facility (5) is connected to a pointer-generator (4) located in the adapter circuit, which is connected to the read address generator (3) and the buffer memory (1), and supplies the payload data bytes and the control data bytes to be sorted to the sort facility (5).

10. A transmission system as claimed in claim 9, characterized in that the sort facility (5) temporarily stores a number of control data bytes and payload data bytes read within several read cycles and then sorts them, or that the sort facility (5) only stores the control data bytes and adds them to the read payload data bytes at established time intervals.

* * * * *

UNITED STATES PATENT AND TRADEMARK OFFICE
CERTIFICATE OF CORRECTION

PATENT NO. : 6,188,685
DATED : February 13, 2001
INVENTOR(S) : Wolf et al.

Synchronous Digital Transmission System

It is certified that error appears in the above-identified patent and that said Letters Patent is hereby corrected as shown below:

column 7, line 5, after "bytes", ":" should be --;--.

column 8, line 21, after "inserted", ":" should be --;--.

Signed and Sealed this

Twenty-ninth Day of May, 2001

Attest:

NICHOLAS P. GODICI

Attesting Officer     Acting Director of the United States Patent and Trademark Office